United States Patent
Melzow et al.

(10) Patent No.: US 11,280,321 B2
(45) Date of Patent: Mar. 22, 2022

(54) DEVICE FOR A CABLE GUIDE OF CABLES BETWEEN A ROTOR HUB AND A ROTOR BLADE OF A WIND TURBINE

(71) Applicant: Nordex Energy SE & Co. KG, Hamburg (DE)

(72) Inventors: Frank Melzow, Hameln (DE); Tobias Brauch, Rostock (DE); Armin Winkler, Luebeck (DE)

(73) Assignee: Nordex Energy SE & Co. KG, Hamburg (DE)

( * ) Notice: Subject to any disclaimer, the term of this patent is extended or adjusted under 35 U.S.C. 154(b) by 160 days.

(21) Appl. No.: 16/536,046

(22) Filed: Aug. 8, 2019

(65) Prior Publication Data

US 2020/0072198 A1 Mar. 5, 2020

(30) Foreign Application Priority Data

Sep. 5, 2018 (EP) .................................. 18192647

(51) Int. Cl.
*F03D 80/80* (2016.01)
*H02G 3/04* (2006.01)

(52) U.S. Cl.
CPC ........... *F03D 80/85* (2016.05); *H02G 3/0456* (2013.01); *F05B 2240/917* (2013.01); *F05B 2260/30* (2013.01)

(58) Field of Classification Search
CPC .......... H02G 1/081; H02G 3/30; H02G 3/263; H02G 3/0456; F05B 2240/917; F05B 2260/30; F03D 80/85; F03D 1/0675
See application file for complete search history.

(56) References Cited

U.S. PATENT DOCUMENTS

| | | | | |
|---|---|---|---|---|
| 891,660 A * | 6/1908 | Boeck | ................... | A47B 49/00 108/105 |
| 1,424,115 A * | 7/1922 | Nileon | ...................... | E06C 1/56 182/198 |
| 1,818,602 A * | 8/1931 | Bowly | ..................... | H04Q 1/06 248/49 |
| 3,133,725 A * | 5/1964 | Lanum | .................. | H02G 1/081 254/134.3 R |
| 3,137,765 A * | 6/1964 | Lanum | .................. | H02G 1/081 174/90 |

(Continued)

FOREIGN PATENT DOCUMENTS

CN 103670957 A 3/2014
DE 202012010236 U1 11/2012
(Continued)

*Primary Examiner* — Eret C McNichols
(74) *Attorney, Agent, or Firm* — Walter Ottesen, P.A.

(57) ABSTRACT

The disclosure relates to a device for a cable guide of cables between a rotor hub and a rotor blade, which is rotatable about its longitudinal axis, of a wind turbine. A device is provided which, with simple means, ensures a reliable and gentle guidance of cables from the rotor hub into the rotor blade of a wind turbine, wherein pitching of the rotor blade should not be hindered and reliable energy supply of the electrical components in or on the rotor blade should be ensured. The rotor hub includes a bracket and the rotor blade includes a blade base. The cable guide is arranged centered in the middle between the bracket and the blade base and includes a cable ladder.

7 Claims, 4 Drawing Sheets

(56) References Cited

U.S. PATENT DOCUMENTS

| | | | | |
|---|---|---|---|---|
| 5,287,947 A * | 2/1994 | McSwain | ............... | E04G 11/48 |
| | | | | 182/186.7 |
| 6,340,141 B1 * | 1/2002 | Rinderer | ............. | H02G 3/0456 |
| | | | | 211/26 |
| 6,470,645 B1 * | 10/2002 | Maliszewski | ........... | F03D 13/22 |
| | | | | 52/745.18 |
| 7,982,330 B1 * | 7/2011 | Ueno | .................... | F03D 13/20 |
| | | | | 290/55 |
| 8,227,695 B2 * | 7/2012 | Ueno | .................... | H02G 11/00 |
| | | | | 174/79 |
| 8,413,405 B2 * | 4/2013 | Meesenburg | ........... | E04H 12/08 |
| | | | | 52/745.17 |
| 8,513,529 B2 * | 8/2013 | Vadstrup | ................ | H02G 1/081 |
| | | | | 174/135 |
| 8,866,330 B2 * | 10/2014 | Domesle | ................ | F03D 80/00 |
| | | | | 290/55 |
| 9,879,758 B2 | 1/2018 | Spies et al. | | |
| 9,982,659 B1 | 5/2018 | Leonard | | |
| 10,047,725 B2 * | 8/2018 | Yenser | ................... | F03D 13/20 |
| 10,047,727 B2 * | 8/2018 | Roer | ....................... | F03D 80/85 |
| 10,385,831 B2 * | 8/2019 | Maryniok | .............. | H02G 3/30 |
| 10,533,539 B2 * | 1/2020 | Nielsen | ................. | F03D 80/85 |
| 10,541,523 B2 * | 1/2020 | Wang | ...................... | H02G 3/34 |
| 10,683,847 B2 * | 6/2020 | Da Silva | ................ | F03D 1/065 |
| 2002/0012582 A1 * | 1/2002 | Kirkegaard | ............. | H02G 7/00 |
| | | | | 415/4.3 |
| 2006/0131107 A1 * | 6/2006 | Duguay | .................... | E04G 5/10 |
| | | | | 182/150 |
| 2009/0206610 A1 * | 8/2009 | Martin | ................... | F03D 80/82 |
| | | | | 290/55 |
| 2010/0006710 A1 * | 1/2010 | Lyness | ................ | H02G 3/0456 |
| | | | | 248/70 |
| 2010/0122508 A1 * | 5/2010 | Kristensen | ............. | F03D 13/20 |
| | | | | 52/651.01 |
| 2010/0196159 A1 * | 8/2010 | Dawson | ................ | F03D 1/0683 |
| | | | | 416/87 |
| 2010/0247326 A1 * | 9/2010 | Prebio | .................... | F03D 80/85 |
| | | | | 416/244 R |
| 2011/0061314 A1 * | 3/2011 | Muhlhauser | ........... | F03D 80/00 |
| | | | | 52/121 |
| 2012/0080266 A1 * | 4/2012 | Brock | ...................... | E04G 5/06 |
| | | | | 182/107 |
| 2012/0133144 A1 * | 5/2012 | Barton | ................... | F03D 80/85 |
| | | | | 290/55 |
| 2013/0170929 A1 * | 7/2013 | Wiechers | ............... | H02G 5/007 |
| | | | | 414/222.01 |
| 2014/0217741 A1 * | 8/2014 | Christensen | ........... | F03D 80/85 |
| | | | | 290/55 |
| 2015/0034891 A1 * | 2/2015 | Carlson | ................. | H02G 1/081 |
| | | | | 254/134.3 R |
| 2015/0222106 A1 * | 8/2015 | Caspari | ..................... | F16L 3/08 |
| | | | | 174/651 |
| 2015/0260166 A1 | 9/2015 | Olesen | | |
| 2015/0361679 A1 * | 12/2015 | Kent | ........................ | E04G 3/20 |
| | | | | 52/40 |
| 2016/0169206 A1 * | 6/2016 | Spielmann | ............ | F03D 1/0666 |
| | | | | 416/61 |
| 2016/0322793 A1 * | 11/2016 | Cuppen | ..................... | H02G 3/32 |
| 2016/0369781 A1 * | 12/2016 | March Nomen | ....... | F03D 80/30 |
| 2017/0307109 A1 * | 10/2017 | McCarter | ................... | F16L 3/16 |
| 2017/0328350 A1 * | 11/2017 | Bendlak | ................ | F03D 1/0675 |
| 2018/0313469 A1 * | 11/2018 | Jette | ........................ | H02G 3/30 |
| 2019/0145384 A1 * | 5/2019 | Spandley | ............. | F03D 1/0675 |
| | | | | 416/95 |
| 2020/0309095 A1 * | 10/2020 | Spandley | ................ | F03D 13/00 |
| 2020/0392943 A1 * | 12/2020 | Messinger | ............. | F03D 80/00 |
| 2021/0262440 A1 * | 8/2021 | Messinger | ............. | F03D 80/60 |

FOREIGN PATENT DOCUMENTS

| | | | |
|---|---|---|---|
| EP | 2762723 | A1 | 8/2014 |
| EP | 2812599 | A2 | 12/2014 |
| EP | 2918828 | A1 | 9/2015 |
| EP | 2732519 | B1 | 1/2018 |

* cited by examiner

DEVICE FOR A CABLE GUIDE OF CABLES BETWEEN A ROTOR HUB AND A ROTOR BLADE OF A WIND TURBINE

CROSS REFERENCE TO RELATED APPLICATION

This application claims priority of European patent application no. 18 192 647.8, filed Sep. 5, 2018, the entire content of which is incorporated herein by reference.

FIELD OF THE INVENTION

The present invention relates to a device for a cable guide of cables and lines between a rotor hub and a rotor blade of a wind turbine. The term cable is used below.

BACKGROUND OF THE INVENTION

A wind turbine normally includes a tower and a nacelle mounted rotatably about the longitudinal axis of the tower on the top of the tower. The nacelle bears the rotor with a rotor hub and at least one rotor blade as well as a generator which converts the energy extracted from the wind by the rotor into electrical energy. Various adjustment devices are used in wind turbines to rotate various components. For example, a pitch system (rotor blade adjustment device) for the pitch angle (angle adjustment) of the rotor blades of the turbine is required. The rotor blades are rotated about their longitudinal axis for the adjustment of the pitch angle (blade pitch angle). The pitch system is normally part of what is known as a pitch control (blade pitch angle control).

The pitch system is arranged between the rotor hub and the rotor blade. Part of the pitch system is a pitch bearing with an external ring and an internal ring which are mounted rotatably with respect to one another. The pitch drives normally have an adjustment drive, for example, an electric motor. The internal ring is generally provided with a toothing in which the pinion of the adjustment drive engages.

Sensors are arranged on or in the rotor blade, for example, for detection of ice on the rotor blade. Other electrical components such as a light on the rotor blade or an anti-icing system also require an energy supply. To this end, a cable guide of flexible supply and/or control lines from the rotor hub which is stationary in relation to the rotor blade to the consumer is required on or in the movable rotor blade. Pitching of a rotor blade is generally carried out in an angle range from 0° to 90°. The rotational movement of the rotor blade is a problem for cable guidance in this case.

Cable guidance from the rotor hub into the rotor blade was previously realized with the aid of a drag chain system.

Utility model DE 202012010236 U1 discloses, for example, a cable carrier for the guidance of cables, hoses or the like between a stationary supply port and a movable consumer. The cable carrier includes a plurality of elements which can be pivoted or angled with respect to one another which are connected to one another in pairs via a joint connection. A tensioning or support device runs along the cable carrier. The elements are connected to one another by transverse webs.

Similar solutions are disclosed in the publications EP 2732519 B1, U.S. Pat. No. 9,879,758 B2 for line-guidance systems for receiving and guiding supply lines between two connection points which are movable relative to one another in a circular movement.

EP 2762723 A1 describes a cable bundling apparatus for cables which hang out of the nacelle, are guided inside the tower and are connected to the tower wall. The cable bundling apparatus is held via at least two tensioning devices in such a manner that a rotation of the cable bundling device is restricted to a predetermined angle range.

A cable carrier arrangement which bears a plurality of energy cable bundles in an upper region of a wind turbine tower is described in US 2015/0260166 A1. A plurality of cable bundling guides with passage openings for in each case one energy cable bundle are arranged at a distance to one another. An offset distance between consecutive cable bundling guides is maintained via an offset fixing means.

SUMMARY OF THE INVENTION

It is an object of the invention to provide a device which with simple means ensures a reliable and gentle guidance of cables from the rotor hub into the rotor blade, which is rotatable about its longitudinal axis, of a wind turbine, wherein pitching of the rotor blade should not be hindered and reliable energy supply of the electrical components in or on the rotor blade should be ensured.

The object can, for example, be achieved via a device for a cable guide of cables between a rotor hub and a rotor blade, which is rotatable about its longitudinal axis, of a wind turbine. The rotor hub includes a bracket and the rotor blade includes a blade base. The device is characterized in that the cable guide is arranged centered in the middle between the bracket and the blade base and includes a cable ladder.

In an embodiment, the cable ladder is connected elastically via a fastener to the bracket and is connected fixedly via a fastener to the blade base.

The cable ladder includes two steel cables which run in parallel and between which rungs are arranged at even distances.

In a further embodiment, the fastener for a fastening to the bracket may include several parts:
a bolt, which is arranged below the bracket, a lifting eye, which is arranged above the bracket, and a spring, by which the bolt is guided below the bracket, the lifting eye being connected fixedly to the bolt.

For a further embodiment, the cable ladder is connected elastically on only one steel cable to the fastener or the cable ladder is connected elastically on both steel cables to the fastener.

For a further embodiment, the fastener for a fastening to the blade base is connected fixedly thereto. Here, lifting eyes or shackles can be used as the fastener.

For a further embodiment, the cables are fixed with holders on the rungs in fastening holes provided for this purpose. Cable ties, cable clamps or the like can be used as holders.

An advantage of the invention lies in the fact that the cable guide is simple and low-cost. The device for cable guidance can be used wherever cables have to be guided from a rotationally fixed location into a system which rotates in a restricted manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
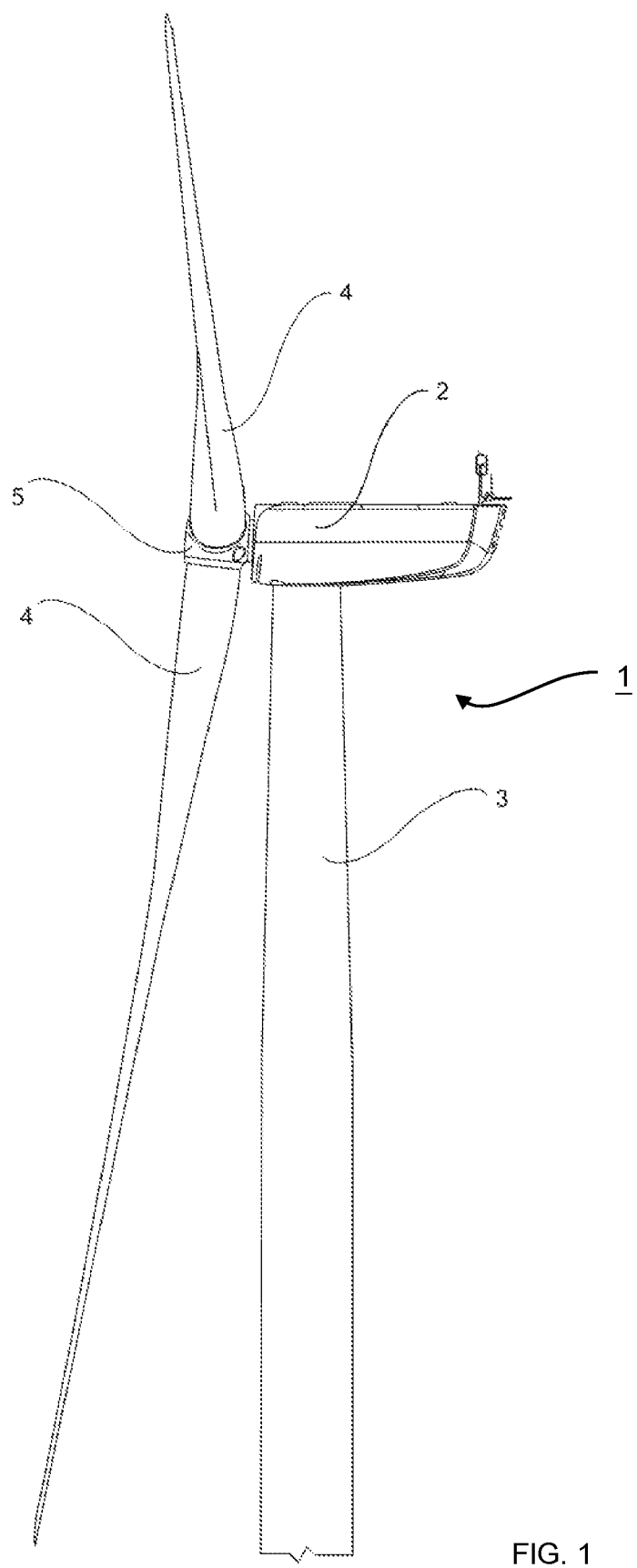
FIG. 1 shows a schematic representation of a wind turbine.

FIG. 1 shows a schematic representation of a wind turbine 1 which includes a tower 3 and a nacelle 2 mounted rotatably on the top of the tower. Nacelle 2 is connected to a rotor hub 5 which itself is connected to, for example, three rotor blades 4. The device for a cable guide 6 from the rotor hub into the rotor blade of wind turbine 1 carries the signal and power cables for the stated sensors. As also mentioned further above, cable guide 6 of flexible supply and/or control lines represents a problem at the interface between rotor hub 5 and rotor blade 4 since rotor blade 4 is rotated in relation to stationary rotor hub 5. Pitching of a rotor blade is generally carried out in an angle range from 0° to 90°. Cable guide 6 must be configured so that the rotational movement of rotor blade 4 does not lead to any damage to cables 64.

Figure 2:
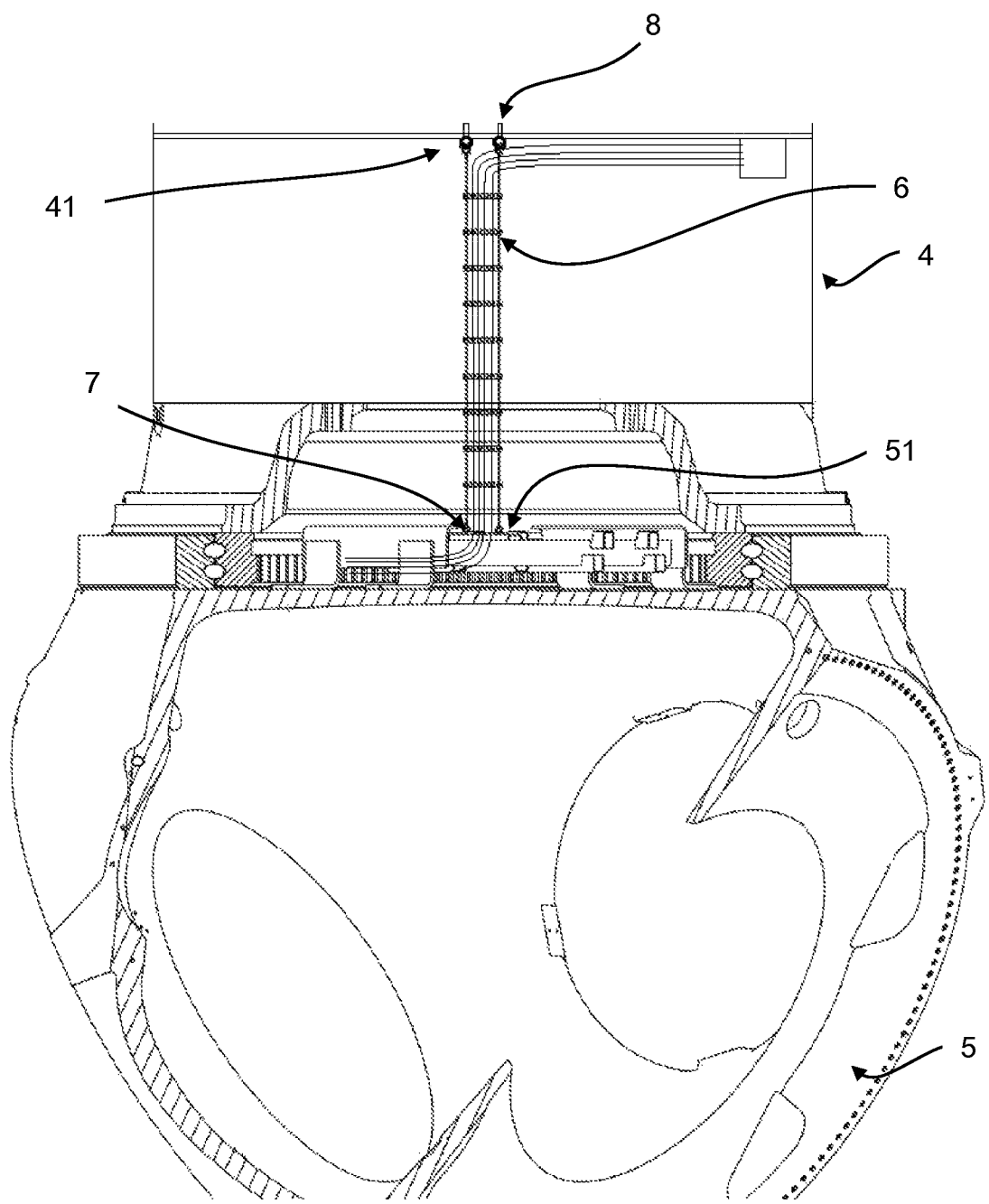
FIG. 2 shows a schematic representation of the rotor hub with the rotor blade connected thereto.
Figure 3:
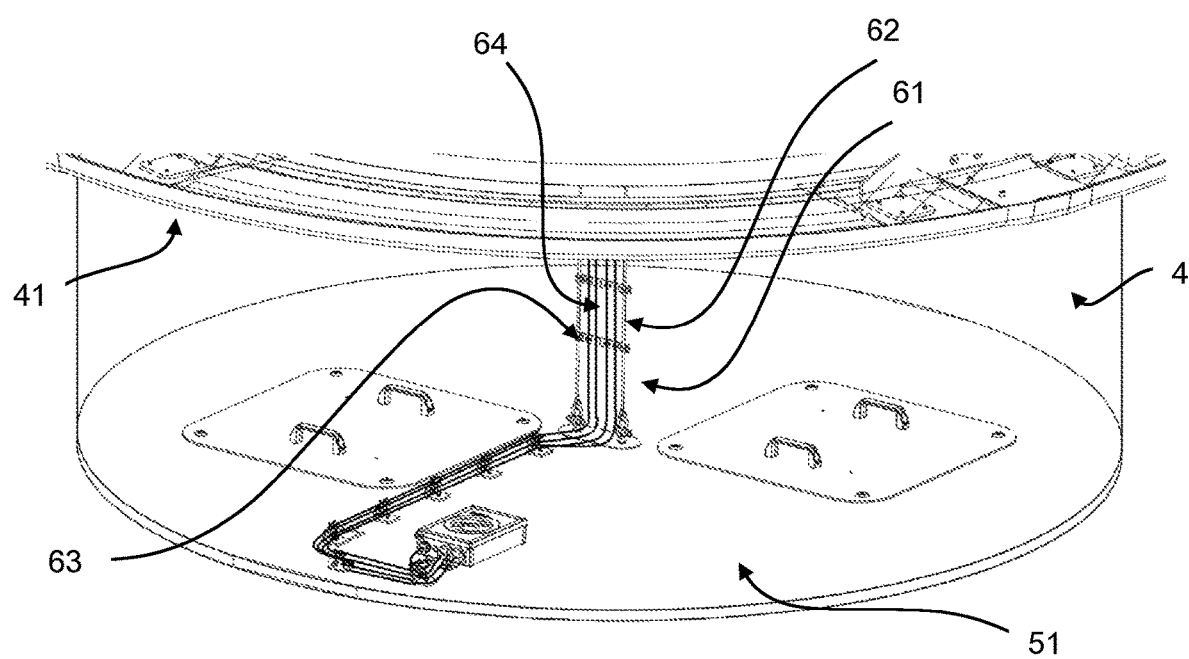
FIG. 3 shows a schematic representation of the bracket of the rotor hub; and, FIG. 4 shows a cut-out of the bracket with a schematic representation of the fastening of the device according to the invention.

FIG. 2 schematically shows rotor hub 5 with rotor blade 4 connected thereto. The device for cable guide 6 is arranged centered in the middle between bracket 51 of rotor hub 5 and blade base 41 of rotor blade 4. FIG. 3 schematically shows bracket 51. The device includes a cable ladder 61 which is connected via fasteners 7 to bracket 51 and via fasteners 8 to blade base 41. Cable ladder 61 includes two steel cables 62 which run in parallel and between which rungs 63 made of sheet metal or flat steel are arranged at even distances. Rungs 63 are fastened via wire cable clamps to steel cables 62. Cables 64 are fixed with holders, here cable ties which are not represented in greater detail, to rungs 63 in fastening holes provided for this purpose.

Figure 4:
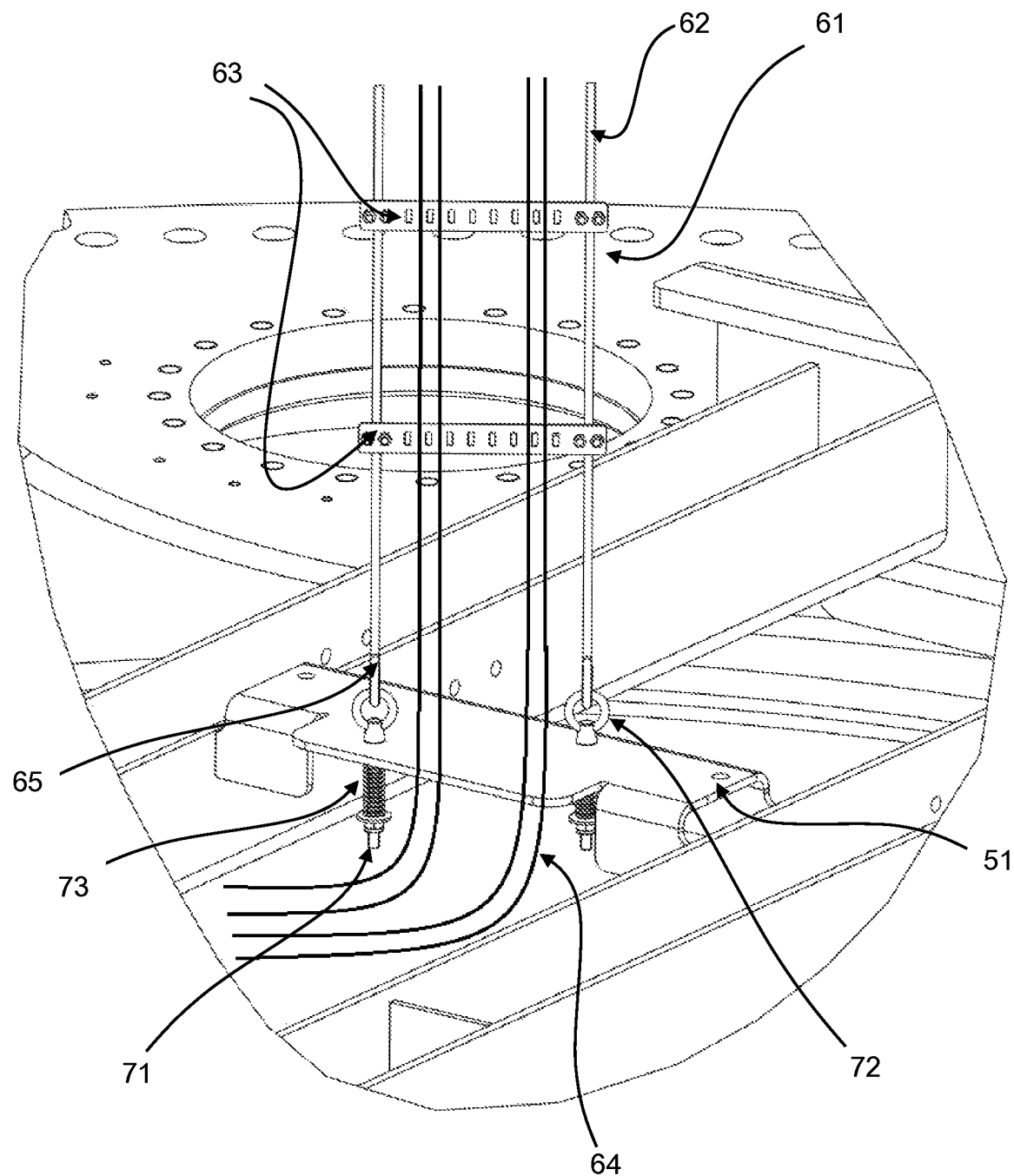

A cut-out of bracket 51 is represented in FIG. 4. The fastening of the device according to the invention to bracket 51 can furthermore be seen. Steel cables 62 of cable ladder 61 are connected by respective fasteners 7 to bracket 51. A fastener 7 for fastening to bracket 51 includes a bolt 71 below bracket 51, a lifting eye 72 above the bracket 51 and a spring 73 by which bolt 71 is guided below bracket 51. Lifting eye 72 is connected fixedly to bolt 71. The steel cable 62 is guided through lifting eye 72 and held in lifting eye 72 via a thimble 65 and cable clamps. Steel cable 62 is suspended elastically via spring 73 as a result of this arrangement—steel cable 62, lifting eye 72, bolt 71 with spring 73—as a result of which a certain expansion of cable ladder 61 can arise if rotor blade 4 is pitched and cable ladder 61 is subject to torsion. Described fastener 7 is furthermore very secure since the entire system cannot be ripped out of bracket 51, this being prevented by bolt 71. It is possible that spring 73 is arranged only on one steel cable 62 since the torsion in the event of a rotation of rotor blade 4 is not as large by at most 90°. If, however, the distance between blade base 41 and bracket 51 should be small, for example, if no extender is arranged, a fastener 7 can also be fitted on both steel cables 62 of cable ladder 61.

The fastening of cable ladder 61 to blade base 41 which is generally made of GRP is not represented. This fastening is carried out via fasteners 8 which are connected fixedly to blade base 41. For example, lifting eyes or shackles can be connected fixedly to blade base 41, steel cable 62 being guided through the lifting eyes and being held via thimbles and cable clamps in the lifting eyes.

Since the previous device described in detail for a cable guide 6 from a rotor hub 5 into a rotor blade 4 of a wind turbine 1 is an exemplary embodiment, it can be modified to a large extent as normal by the person skilled in the art without departing from the scope of the invention. In particular, the concrete configuration of cable ladder 61 can proceed in a different form than that described here. Fasteners 7 and 8 can also be configured in a different form if this is necessary on the grounds of space or for reasons of configuration. The use of the indeterminate article "a" furthermore does not rule out that the relevant features may also be present several times.

It is understood that the foregoing description is that of the preferred embodiments of the invention and that various changes and modifications may be made thereto without departing from the spirit and scope of the invention as defined in the appended claims.

REFERENCE NUMBERS

1 Wind turbine
2 Nacelle
3 Tower
4 Rotor blade
41 Blade base of a rotor blade 4
5 Rotor hub
51 Bracket of rotor hub 5
6 Cable guide
61 Cable ladder
62 Steel cable
63 Rungs
64 Cable
65 Thimble
7 Fastener on bracket 51
71 Bolt
72 Lifting eye
73 Spring
8 Fastener on blade base 41

What is claimed is:

1. A device for cable guidance of cables between a rotor hub and a rotor blade of a wind turbine, wherein the rotor blade is rotatable about its longitudinal axis, the rotor hub including a bracket and the rotor blade including a blade base, the device comprising:
    a cable guide arranged between the bracket and the blade base;
    said cable guide including a cable ladder having two support cables running side by side in spaced relationship to each other;
    said cable ladder further including a plurality of rungs arranged between said two support cables for accommodating thereon said cables running between said rotor hub and said rotor blade;
    a first fastener;
    a second fastener; and,
    said cable ladder being elastically connected to one of said bracket and said blade base via one of said first fastener and said second fastener.

2. The device of claim 1, wherein said support cables of said cable ladder are respective steel cables which run in parallel to each other.

3. The device of claim 1, wherein at least one of said first and said second fasteners includes lifting eyes or shackles.

4. The device of claim 1, wherein said cable ladder is fixedly connected to the other one of said bracket and said blade base via the other one of said first fastener and said second fastener.

5. A device for cable guidance of cables between a rotor hub and a rotor blade of a wind turbine, wherein the rotor blade is rotatable about its longitudinal axis, the rotor hub including a bracket and the rotor blade including a blade base, the device comprising:

a cable guide arranged centered in a middle position between the bracket and the blade base;

said cable guide including a cable ladder;

a first fastener;

a second fastener;

said cable ladder being elastically connected to the bracket via said first fastener and being fixedly connected to the blade base via said second fastener;

said first fastener including a bolt arranged below the bracket, a lifting eye arranged above the bracket, and a spring;

said bolt being guided below the bracket by said spring; and, said lifting eye being connected fixedly to said bolt.

6. A device for cable guidance of cables between a rotor hub and a rotor blade of a wind turbine, wherein the rotor blade is rotatable about its longitudinal axis, the rotor hub including a bracket and the rotor blade including a blade base, the device comprising:

a cable guide arranged centered in a middle position between the bracket and the blade base;

said cable guide including a cable ladder;

a first fastener;

a second fastener;

said cable ladder being elastically connected to the bracket via said first fastener and being fixedly connected to the blade base via said second fastener; and, said cable ladder including two steel cables and being elastically connected on only one of said two steel cables with said first fastener.

7. A device for cable guidance of cables between a rotor hub and a rotor blade of a wind turbine, wherein the rotor blade is rotatable about its longitudinal axis, the rotor hub including a bracket and the rotor blade including a blade base, the device comprising:

a cable guide arranged centered in a middle position between the bracket and the blade base;

said cable guide including a cable ladder;

a first fastener;

a second fastener;

said cable ladder being elastically connected to the bracket via said first fastener and being fixedly connected to the blade base via said second fastener;

said cable ladder including two steel cables which run in parallel and a plurality of rungs arranged between said two steel cables at even distances;

said rungs defining fastening holes; and, said two steel cables being fixed on said rungs in said fastening holes with holders.

\* \* \* \* \*